US008329852B2

(12) United States Patent
Heuer et al.

(10) Patent No.: US 8,329,852 B2
(45) Date of Patent: Dec. 11, 2012

(54) COPOLYCARBONATES HAVING IMPROVED SURFACE HARDNESS

(75) Inventors: Helmut-Werner Heuer, Krefeld (DE); Rolf Wehrmann, Krefeld (DE); Alexander Karbach, Krefeld (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 13/131,667

(22) PCT Filed: Nov. 14, 2009

(86) PCT No.: PCT/EP2009/008126
§ 371 (c)(1),
(2), (4) Date: May 27, 2011

(87) PCT Pub. No.: WO2010/060549
PCT Pub. Date: Jun. 3, 2010

(65) Prior Publication Data
US 2011/0230626 A1 Sep. 22, 2011

(30) Foreign Application Priority Data

Nov. 28, 2008 (DE) .......................... 10 2008 059 658

(51) Int. Cl.
*C08G 64/00* (2006.01)
*C08G 64/02* (2006.01)
(52) U.S. Cl. ........ 528/196; 525/394; 525/462; 528/198; 528/201
(58) Field of Classification Search .................. 525/394, 525/462; 528/196, 198, 201
See application file for complete search history.

(56) References Cited

U.S. PATENT DOCUMENTS

| 2,964,794 | A | 12/1960 | Peilstoecker et al. |
| 3,398,212 | A | 8/1968 | Jackson et al. |
| 3,517,071 | A | 6/1970 | Caldwell et al. |
| 2007/0009741 | A1 | 1/2007 | Boven et al. |
| 2011/0144284 | A1* | 6/2011 | Heuer et al. .................. 525/394 |

FOREIGN PATENT DOCUMENTS

| DE | 1031507 B | 6/1958 |
| DE | 1031512 B | 6/1958 |
| DE | 1137167 B | 9/1962 |
| DE | 1300267 B | 7/1969 |
| DE | 1544920 | 7/1969 |
| DE | 1785137 A1 | 1/1972 |
| DE | 2701173 A1 | 7/1978 |
| EP | 0089801 A1 | 9/1983 |
| EP | 0269324 A2 | 6/1988 |
| EP | 0634445 A1 | 1/1995 |
| GB | 905072 A | 9/1962 |
| GB | 1009019 A | 11/1965 |
| GB | 1009020 A | 11/1965 |
| GB | 1592724 A | 7/1981 |
| JP | 4037859 A | 2/1992 |
| JP | 4153606 A | 5/1992 |
| WO | WO-2007008390 A2 | 1/2007 |
| WO | WO-2008008599 A2 | 1/2008 |
| WO | WO-2008157328 A1 | 12/2008 |

OTHER PUBLICATIONS

"Phenol Derivatives," Ullmann's Encyclopedia of Industrial Chemistry, 5th ed., vol. A19, pp. 348-352.
"Polycarbonates," Encyclopedia of Polymer Science, vol. 10, 1969, pp. 710-764.
"VIII. Polyesters," Polymer Reviews, 1965, vol. 10, pp. 325-393.
Schnell, H., "Chemistry and Physics of Polycarbonates," Polymer Reviews, 1964, vol. 9, pp. 1-225.
"Phenol Derivatives," Ullmann's Encyclopedia of Industrial Chemistry (Jan. 8, 1999), 5th ed., vol. A19, pp. 348-352.

* cited by examiner

*Primary Examiner* — Terressa Boykin
(74) *Attorney, Agent, or Firm* — Connolly Bove Lodge & Hutz LLP

(57) ABSTRACT

The present invention relates to copolycarbonates having improved surface hardness, processes for the preparation thereof and the use thereof for the production of blends, shaped articles and extrudates.

15 Claims, No Drawings

COPOLYCARBONATES HAVING IMPROVED SURFACE HARDNESS

CROSS-REFERENCE TO RELATED APPLICATIONS

This application is a national stage application (under 35 U.S.C. §371) of PCT/EP2009/008126, filed Nov. 14, 2009, which claims benefit of German application 10 2008 059 658.2, filed Nov. 28, 2008, which are both herein incorporated by reference in their entireties for all useful purposes.

BACKGROUND

The present invention relates to polycarbonate compositions having improved surface hardness, processes for the preparation thereof and the use thereof for the production of blends, shaped articles and extrudates.

Aromatic polycarbonates belong to the group consisting of the industrial thermoplastics. They are distinguished by the combination of the technologically important properties of transparency, heat distortion resistance and toughness.

WO 2007/008 390 A2 describes polycarbonates which contain 1,1-bis(3-methyl-4-hydroxyphenyl)cyclohexane and optionally 2,2-bis(3-methyl-4-hydroxyphenyl)propane. It is disclosed that windows and other articles comprising this copolycarbonate have particularly good scratch resistance.

WO 2008/008 599 A2 describes the use of polycarbonates which may contain 2,2-bis(3-methyl-4-hydroxyphenyl)propane and/or 1,1-bis(3-methyl-4-hydroxyphenyl)cyclohexane for the production of flameproofed articles which, with a scratching force of 8 newton, have a scratch depth of less than 20 microns.

Diphenols containing rigid ring bridges in the molecule were described in DE 13 00 267 A. The preparation of linear polycarbonates from these diphenols is also mentioned herein. However, only homopolycarbonates are prepared in the examples. Thus, for example, the diphenol norbornylidene)diphenol, which contains a saturated bicyclic, bridged hydrocarbon ring, is described here. In the document, the object is to provide polycarbonates having improved high-temperature properties. The homopolycarbonates described are said to have a better heat distortion resistance (high glass transition temperature) and solubility in volatile solvents. This is seen as an advantage according to the invention since articles such as films can be obtained therewith, which can be obtained by film casting, or polymer strands can be obtained therefrom by wet or dry spinning from organic solution. U.S. Pat. No. 3,517,071 A, which belongs to the same patent family, also discloses only homopolycarbonates in the examples. For increasing the scratch resistance of the surface hardness of copolycarbonates which contain corresponding structural elements, the patent provides no teaching with regard to action.

DESCRIPTION OF PREFERRED EMBODIMENT

The present invention therefore achieves the object of providing copolycarbonates and processes for the preparation thereof, which have a particularly high surface hardness. It also achieves the object of providing copolycarbonates for applications in which particular requirements regarding the stability of the surface are set, without having to apply an additional scratch-resistant layer.

Surprisingly, it was found that copolycarbonates based on diphenols which have a rigid ring bridge in the molecule have an even higher surface hardness than the known copolycarbonates with increased scratch resistance.

The present invention therefore relates to copolycarbonates containing one or more monomer units derived from compounds of the general formulae (1a) and (1b),

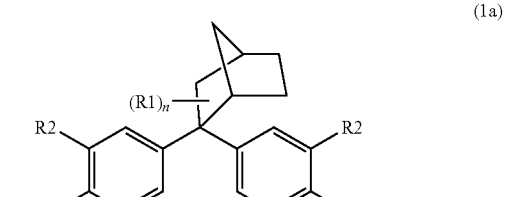

(1a)

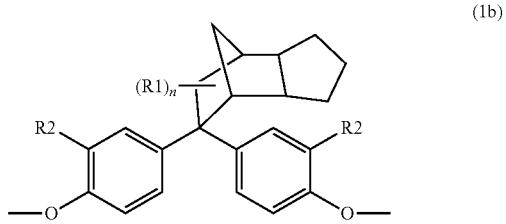

(1b)

in which the R1, independently of one another, represent $C_1$-$C_4$-alkyl, preferably methyl, ethyl, n-propyl, isopropyl, tert-butyl, very particularly preferably methyl, n represents 0, 1, 2 or 3, and the R2, independently of one another, represent H, linear or branched $C_1$-$C_{10}$ alkyl, preferably linear or branched $C_1$-$C_6$ alkyl, particularly preferably linear or branched $C_1$-$C_4$ alkyl, in particular methyl, ethyl, n-propyl, isopropyl, tert-butyl, and very particularly preferably methyl.

The monomer unit is introduced via the corresponding diphenols of the general formulae (2a) and (2b), in which the R1 and R2 have the meanings stated under the formulae (1a) and (1b).

The compounds according to the invention which are described by the general formulae (2c) and (2d) are particularly preferred.

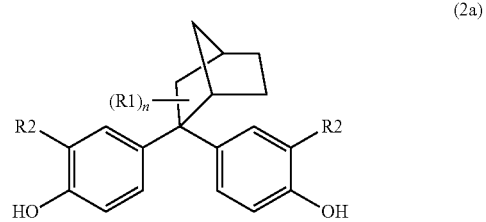

(2a)

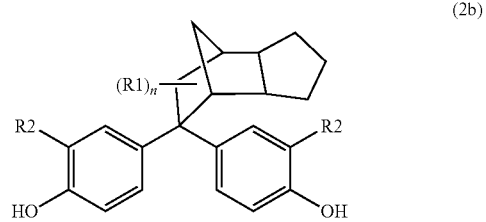

(2b)

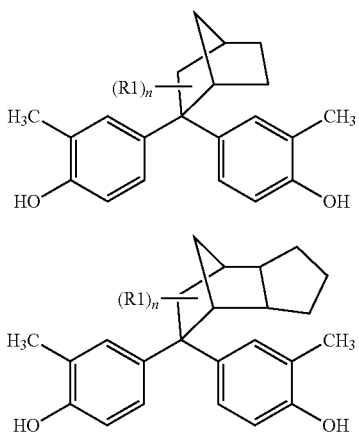

The compounds which are described by the formulae (2e), (2f), (2 g) or (2 h) are very particularly preferred.

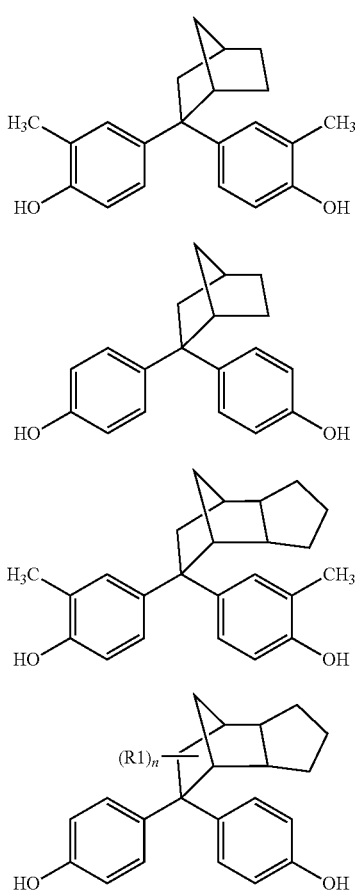

The diphenols of the formulae (2) which are to be used according to the invention and their use in homopolycarbonates are known in part in the literature. Copolycarbonates obtainable from these diphenols and the usability thereof for applications with required, relatively high surface hardness have however not been described to date.

The proportion of the diphenols according to the invention in the copolycarbonate is 0.1-70 mol %, preferably 1-60 mol %, particularly preferably 5-40 mol % and very particularly preferably 10-35 mol % (based on the sum of the mols of diphenols used).

In addition to one or more diphenols of the formulae (2), one or more diphenols selected from the group of compounds of the formula (3a) are present as a further monomer unit:

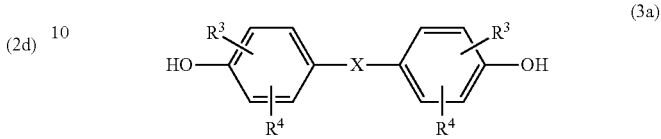

in which

R3 and R4, independently of one another, represent H, C1-C18-alkyl-, C1-C18-alkoxy, halogen, such as Cl or Br, or in each case optionally substituted aryl or aralkyl, preferably H or C1-C12-alkyl, particularly preferably H or C1-C8-alkyl and very particularly preferably H or methyl, and X represents a single bond, $-SO_2-$, $-CO-$, $-O-$, $-S-$, $C_1$- to $C_6$-alkylene, $C_2$- to $C_5$-alkylidene or $C_5$- to $C_6$-cycloalkylidene, which may be substituted by $C_1$- to $C_6$-alkyl, preferably methyl or ethyl, and furthermore represents $C_6$- to $C_{12}$-arylene, which may optionally be condensed with further aromatic rings containing heteroatoms.

Preferably, X represents a single bond, $C_1$ to $C_5$-alkylene, $C_2$ to $C_5$-alkylidene, $C_5$ to $C_6$-cyclo-alkylidene, $-O-$, $-SO-$, $-CO-$, $-S-$, $-SO_2-$ or one a radical of the formula

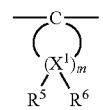

in which $R^5$ and $R^6$, individually selectable for each $X^1$, independently of one another, denote hydrogen or $C_1$ to $C_6$-alkyl, preferably hydrogen, methyl or ethyl, and $X^1$ denotes carbon and m denotes an integer from 4 to 7, preferably 4 or 5, with the proviso that $R^5$ and $R^6$ are simultaneously alkyl on at least one atom $X^1$.

Hydroquinone, resorcinol, dihydroxybiphenyls, bis(hydroxyphenyl)alkanes, bis(hydroxy-phenyl)cycloalkanes, bis(hydroxyphenyl) sulphides, bis(hydroxyphenyl)ethers, bis(hydroxyphenyl) ketones, bis(hydroxyphenyl) sulphones, bis(hydroxyphenyl) sulphoxides, α,α'-bis(hydroxyphenyl) diisopropylbenzenes and their compounds alkylated on the nucleus and halogenated on the nucleus, and also α,ω-bis(hydroxyphenyl)polysiloxanes, are mentioned by way of example for the diphenols of the formula (3a), which can be used in addition to the diphenols of the formula (1) according to the invention.

Preferred diphenols of the formula (3a) are, for example, 4,4'-dihydroxybiphenyl (DOD), 4,4'-dihydroxybiphenyl ether (DOD ether), 2,2-bis(4-hydroxyphenyl)propane (bisphenol A), 1,1-bis(4-hydroxyphenyl)-3,3,5-trimethylcyclohexane (bisphenol TMC), 1,1-bis(4-hydroxyphenyl)cyclo-hexane, 2,4-bis(4-hydroxyphenyl)-2-methylbutane, 1,1-bis(4-hydroxyphenyl)-1-phenylethane, 1,1-bis[2-(4- hydroxyphenyl)-2-propyl]benzene, 1,3-bis[2-(4-hydroxyphenyl)-2-propyl]benzene (bisphenol M), 2,2-bis(3-methyl-4-hydroxyphenyl)propane, 2,2-bis(3-chloro-4-hydroxyphenyl)-propane, bis(3,5-dimethyl-4-hydroxyphenyl)methane, 2,2-bis(3,5-dimethyl-4-hydroxyphenyl)-propane, bis(3,5-dimethyl-4-hydroxyphenyl)sulphone, 2,4-bis(3,5-dimethyl-4-hydroxyphenyl)-2-methylbutane, 2,2-bis(3,5-dichloro-4-hydroxyphenyl)propane and 2,2-bis(3,5-dibromo-4-hydroxyphenyl)propane.

Particularly preferred diphenols are, for example, 2,2-bis (4-hydroxyphenyl)propane (bisphenol A), 4,4'-dihydroxybiphenyl (DOD), 4,4'-dihydroxybiphenyl ether (DOD ether), 1,3-bis[2-(4-hydroxyphenyl)-2-propyl]benzene (bisphenol M), 2,2-bis(3,5-dimethyl-4-hydroxyphenyl)propane, 1,1-bis (4-hydroxyphenyl)-1-phenylethane, 2,2-bis(3,5-dichloro-4-hydroxyphenyl)propane, 2,2-bis(3,5-dibromo-4-hydroxyphenyl)propane, 1,1-bis(4-hydroxyphenyl)cyclohexane and 1,1-bis(4-hydroxyphenyl)-3,3,5-trimethylcyclohexane (bisphenol TMC).

Compounds of the general formula (3b)

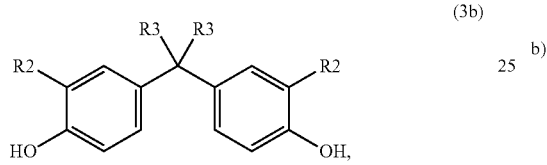

(3b)

in which $R^2$ and $R^3$, independently of one another, represent H, linear or branched $C_1$-$C_{10}$ alkyl, preferably linear or branched $C_1$-$C_6$-alkyl, particularly preferably linear or branched $C_1$-$C_4$ alkyl, very particularly preferably $C_1$-alkyl(methyl) are very particularly preferred.

Very particular preference is further given here to diphenols where R2=methyl, in particular to the diphenol (3c) where R2=methyl and R3=methyl.

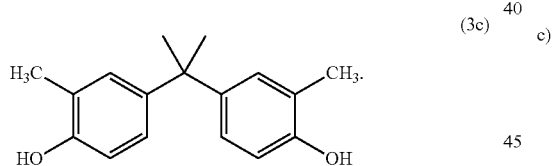

(3c)

The diphenols of the general formulae (3) can be used both alone and as a mixture with one another. The diphenols are known from the literature or can be prepared by processes known from the literature (see, for example, H. J. Buysch et al., Ullmann's Encyclopedia of Industrial Chemistry, VCH, New York 1991, 5th Ed., Vol. 19, p. 348).

Copolycarbonates generally contain, alongside a bisphenol selected from compounds of the formulae (2), up to 99.9 mol %, preferably up to 95 mol %, particularly preferably up to 90 mol %, of at least one further diphenol, selected from compounds of the formula (3) (based on the entirety of the mols of diphenols used). It is preferable that the copolycarbonates contain, as lower limit, at least 30 mol %, particularly preferably 40 mol % and very particularly preferably 60 mol % (based on the entirety of the mols of diphenols used) selected from compounds of the general formulae (3).

The preferred diphenolate units of the copolycarbonates according to the invention are derived from monomers having the general structures of the formulae (2) and (3) described above.

The copolycarbonates may be present as block and random copolycarbonates. Random copolycarbonates which contain diphenolate units which are derived from diphenols of the following general formulae are particularly preferred:

a)

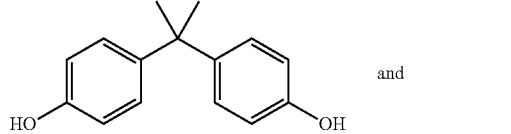

(3e)

and

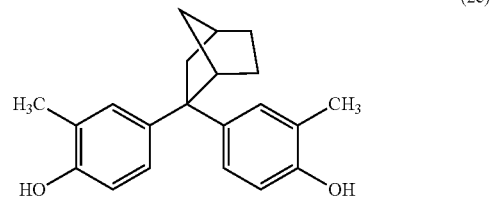

(2e)

b)

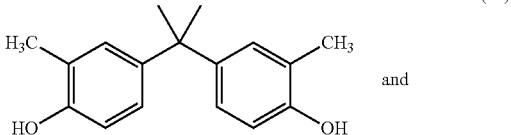

(3c)

and

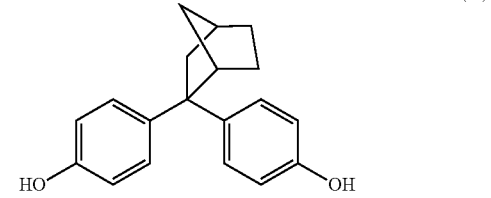

(2f)

c)

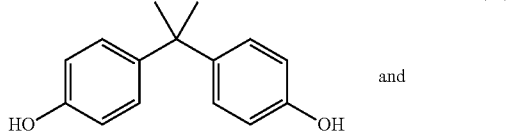

(3e)

and

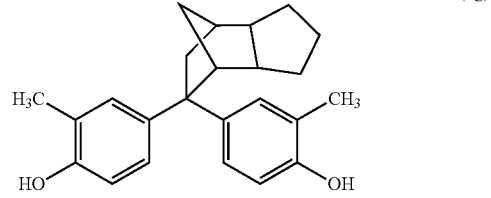

(2g)

d)

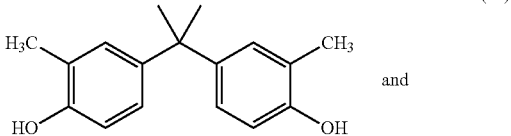

(3c)

and

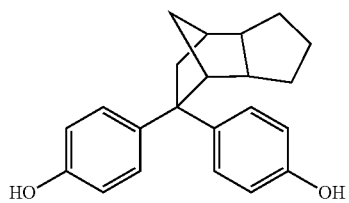

(2h)

Here, the ratio of the frequency of the diphenolate monomer units in the copolycarbonate is obtained from the molar ratio of the diphenols used.

The polycarbonates or the copolycarbonates may also be branched. For this purpose, certain small amounts, preferably amounts between 0.05 and 5 mol %, particularly preferably 0.1-3 mol %, very particularly preferably 0.1-2 mol %, based on the moles of diphenols used, of trifunctional compounds, such as, for example, isatinbiscresol (IBK) or phloroglucinol, 4,6-dimethyl-2,4,6-tri(4-hydroxyphenyl)hept-2-ene; 4,6-dimethyl-2,4,6-tri(4-hydroxyphenyl)heptane; 1,3,5-tri(4-hydroxyphenyl)benzene; 1,1,1-tri(4-hydroxyphenyl)ethane (THPE); tri(4-hydroxyphenyl)phenyl-methane; 2,2-bis[4,4-bis(4-hydroxyphenyl)cyclohexyl]propane; 2,4-bis(4-hydroxyphenyl-isopropyl)phenol; 2,6-bis(2-hydroxy-5'-methylbenzyl)-4-methylphenol; 2-(4-hydroxyphenyl)-2-(2,4-dihydroxyphenyl)propane; hexa(4-(4-hydroxyphenylisopropyl)phenyl)orthoterephthalic acid ester; tetra(4-hydroxyphenyl)methane; tetra(4-(4-hydroxyphenylisopropyl)phenoxy)methane; α,α', α"-tris(4-hydroxyphenyl)-1,3,5-triisopropylbenzene; 2,4-dihydroxybenzoic acid; trimesic acid; cyanuric chloride; 3,3-bis(3-methyl-4-hydroxyphenyl)-2-oxo-2,3-dihydroindole; 1,4-bis(4',4"-dihydroxytriphenyl)methyl)benzene and in particular 1,1,1-tri(4-hydroxyphenyl)ethane and bis(3-methyl-4-hydroxyphenyl)-2-oxo-2,3-dihydroindole, are used as so-called branching agents. Preferably, isatinbiscresol and 1,1,1-tri(4-hydroxyphenyl)ethane and bis(3-methyl-4-hydroxyphenyl)-2-oxo-2,3-dihydroindole are used as branching agents.

By using these branching agents, branched structures result. The resulting long-chain branching generally leads to rheological properties of the polycarbonates obtained which manifest themselves in a structural viscosity compared with linear types.

For obtaining high molecular weight polycarbonates by the phase boundary process, the alkali metal salts of diphenols are reacted with phosgene in the two-phase mixture. The molecular weight can be controlled by the amount of monophenols, such as, for example, phenol or tert-butylphenol. In these reactions, virtually exclusively linear polymers form. This can be detected by end group analysis. By targeted use of so-called branching agents, as a rule polyhydroxylated compounds, branched polycarbonates are also obtained.

The present invention furthermore relates to a process for the preparation of the copolycarbonates according to the invention containing diphenolate units derived from diphenols of the formulae (2) and (3), characterized in that the diphenols and possibly branching agents are dissolved in aqueous alkaline solution and reacted with a carbonate source, such as phosgene, optionally dissolved in a solvent, in a two-phase mixture of an aqueous alkaline solution, an organic solvent and a catalyst, preferably an amine compound. The reaction procedure may also be effected in a plurality of stages.

Such processes for the preparation of polycarbonate are known in principle as two-phase boundary processes, for example from H. Schnell, Chemistry and Physics of Polycarbonates, Polymer Reviews, Vol. 9, Interscience Publishers, New York 1964 page 33 et seq., and on Polymer Reviews; Vol. 10, "Condensation Polymers by Interfacial and Solution Methods", Paul W. Morgan, Interscience Publishers, New York 1965, Chapter VIII, page 325, and the underlying conditions are therefore familiar to the person skilled in the art.

The concentration of the diphenols in the aqueous alkaline solution is 2 to 25% by weight, preferably 2 to 20% by weight, particularly preferably 2 to 18% by weight and very particularly preferably 3 to 15% by weight. The aqueous alkaline solution consists of water, in which hydroxides of alkali metals or alkaline earth metals are dissolved. Sodium and potassium hydroxides are preferred.

With the use of phosgene as a carbonate source, the volume ratio of aqueous alkaline solution to organic solvent is 5:95 to 95:5, preferably 20:80 to 80:20, particularly preferably 30:70 to 70:30 and very particularly preferably 40:60 to 60:40. The molar ratio of diphenol to phosgene is less than 1:10, preferably less than 1:6, particularly preferably less than 1:4 and very particularly preferably less than 1:3. The concentration of the branched polycarbonates and copolycarbonates according to the invention in the organic phase is 1.0 to 25% by weight, preferably 2 to 20% by weight, particularly preferably 2 to 18% by weight and very particularly preferably 3 to 15% by weight.

The concentration of the amine compound, based on the amount of diphenol used, is 0.1 to 10 mol %, preferably 0.2 to 8 mol %, particularly preferably 0.3 to 6 mol % and very particularly preferably 0.4 to 5 mol %.

Diphenols are to be understood as meaning diphenol mixtures selected from the above-mentioned compounds, having proportions of the abovementioned branching agents. The carbonate source is phosgene, diphosgene or triphosgene, preferably phosgene. If phosgene is used, a solvent can optionally be dispensed with and the phosgene passed directly into the reaction mixture.

Tertiary amines, such as triethylamine or N-alkylpiperidines, can be used as a catalyst. Suitable catalysts are trialkylamines and 4-(dimethylamino)pyridine. Triethylamine, tripropylamine, triisopropylamine, tributylamine, triisobutylamine, N-methylpiperidine, N-ethylpiperidine and N-propylpiperidine are particularly suitable.

Halogenated hydrocarbons, such as methylene chloride, chlorobenzene, dichlorobenzene, trichlorobenzene or mixtures thereof, or aromatic hydrocarbons, such as, for example, toluene or xylenes, are suitable as an organic solvent. The reaction temperature may be −5° C. to 100° C., preferably 0° C. to 80° C., particularly preferably 10° C. to 70° C. and very particularly preferably 10° C. to 60° C.

The preparation of the polycarbonates by the melt transesterification process, in which the diphenols are reacted with diaryl carbonates, generally diphenyl carbonate, in the presence of catalysts, such as alkali metal salts, ammonium or phosphonium compounds, in the melt, is also possible.

The melt transesterification process is described, for example, in Encyclopedia of Polymer Science, Vol. 10 (1969), Chemistry and Physics of Polycarbonates, Polymer Reviews, H. Schnell, Vol. 9, John Wiley and Sons, Inc. (1964) and DE-C 10 31 512.

In the melt transesterification process, the aromatic dihydroxy compounds already described in the case of the phase boundary process are transesterified with carbonic acid diesters with the aid of suitable catalysts and optionally further additives in the melt.

Carbonic acid diesters in the context of the invention are those of formulae (4) and (5)

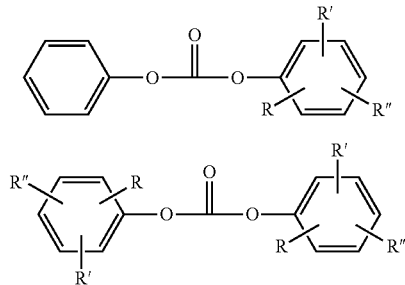

in which
R, R' and R', independently of one another, may represent H, optionally branched $C_1$-$C_{34}$-alkyl/cycloalkyl, $C_7$-$C_{34}$-alkaryl or $C_6$-$C_{34}$-aryl,
for example
diphenyl carbonate,
butylphenyl phenyl carbonate, di-butylphenyl carbonate,
isobutylphenyl phenyl carbonate, diisobutylphenyl carbonate,
tert-butylphenyl phenyl carbonate, di-tert-butylphenyl carbonate,
n-pentylphenyl phenyl carbonate, di(n-pentylphenyl)carbonate,
n-hexylphenyl phenyl carbonate, di(n-hexylphenyl) carbonate,
cyclohexylphenyl phenyl carbonate, di-cyclohexylphenyl carbonate,
phenylphenol phenyl carbonate, diphenylphenol carbonate,
isooctylphenyl phenyl carbonate, diisooctylphenyl carbonate,
n-nonylphenyl phenyl carbonate, di(n-nonylphenyl) carbonate,
cumylphenyl phenyl carbonate, dicumylphenyl carbonate,
naphthylphenyl phenyl carbonate, dinaphthylphenyl carbonate,
di-tert-butylphenyl phenyl carbonate, di(di-tert-butylphenyl) carbonate,
dicumylphenyl phenyl carbonate, di(dicumylphenyl) carbonate,
4-phenoxyphenyl phenyl carbonate, di(4-phenoxyphenyl) carbonate,
3-pentadecylphenyl phenyl carbonate, di(3-pentadecylphenyl) carbonate
tritylphenyl phenyl carbonate, ditritylphenyl carbonate,
preferably
diphenyl carbonate,
tert-butylphenyl phenyl carbonate, di-tert-butylphenyl carbonate,
phenylphenol phenyl carbonate, diphenylphenol carbonate,
cumyiphenyl phenyl carbonate, dicumylphenyl carbonate, particularly preferably diphenyl carbonate.
It is also possible to use mixtures of said carbonic acid diesters.
The proportion of carbonic acid esters is 100 to 130 mol %, preferably 103 to 120 mol %, particularly preferably 103 to 109 mol %, based on the dihydroxy compound.
In the context of the invention, basic catalysts, as described in the stated literature, such as, for example, alkali metal and alkaline earth metal hydroxides and oxides, but also ammonium or phosphonium salts, referred to below as onium salts, are used as catalysts in the melt transesterification process. Preferably onium salts, particularly preferably phosphonium salts, are used. Phosphonium salts in the context of the invention are those of the following general formula (6)

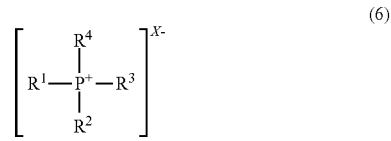

in which
$R^{1-4}$ may be the same or different $C_1$-$C_{10}$-alkyls, $C_6$-$C_{10}$-aryls, $C_7$-$C_{10}$-aralkyls or $C_5$-$C_6$-cycloalkyls, preferably methyl or $C_6$-$C_{14}$-aryls, particularly preferably methyl or phenyl, and
$X^-$ may be an anion, such as hydroxide, sulphate, hydrogen sulphate, bicarbonate, carbonate, a halide, preferably chloride, or an alcoholate of the formula OR, it being possible for R to be $C_6$-$C_{14}$-aryl or $C_7$-$C_{12}$-aralkyl, preferably phenyl. Preferred catalysts are
tetraphenylphosphonium chloride,
tetraphenylphosphonium hydroxide,
tetraphenylphosphonium phenolate,
particularly preferably tetraphenylphosphonium phenolate.
The catalysts are preferably used in amounts of $10^{-8}$ to $10^{-3}$ mol, based on one mole of diphenol, particularly preferably in amounts of $10^{-7}$ to $10^{-4}$ mol.
Further catalysts may be used alone or optionally in addition to the onium salt in order to increase the rate of the polymerization. These include salts of alkali metals and alkaline earth metals, such as hydroxides, alkoxides and aryl oxides of lithium, sodium and potassium, preferably hydroxide, alkoxide or aryl oxide salts of sodium. Most preferred are sodium hydroxide and sodium phenolate. The amounts of the cocatalyst may be in the range from 1 to 200 ppb, preferably 5 to 150 ppb and most preferably 10 to 125 ppb, calculated in each case as sodium.
The transesterification reaction of the aromatic dihydroxy compound and of the carbonic acid diester in the melt is preferably carried out in two stages. In the first stage, the melting of the aromatic dihydroxy compound and of the carbonic acid diester takes place at temperatures of 80-250° C., preferably 100-230° C., particularly preferably 120-190° C., under atmospheric pressure in 0-5 hours, preferably 0.25-3 hours. After addition of the catalyst, the oligocarbonate is prepared from the aromatic dihydroxy compound and the carbonic acid diester by applying a vacuum (up to 2 mmHg) and increasing the temperature (up to 260° C.), by distilling off the monophenol. The main amount of vapours from the process occus hereby. The oligocarbonate thus prepared has a weight average molar mass $M_w$ (as determined by measuring the relative solution viscosity in dichloromethane or in mixtures of equal amounts by weight of phenol/o-dichlorobenzene, calibrated by light scattering) in the range from 2000 g/mol to 18 000 g/mol, preferably from 4000 g/mol to 15 000 g/mol.
In the second stage, the polycarbonate is prepared during the polycondensation by further increasing the temperature to 250-320° C., preferably 270-295° C., and a pressure of <2 mmHg. The remainder of vapours from the process is removed here.

The catalysts may also be used in combination (two or more) with one another.

For the use of alkali metal/alkaline earth metal catalysts, it may be advantageous to add the alkali metal/alkaline earth metal catalysts at a later time (for example after the oligocarbonate synthesis, during the polycondensation in the second stage).

The reaction of the aromatic dihydroxy compound and of the carbonic acid diester to give the polycarbonate can be carried out batchwise or preferably continuously in the process according to the invention, for example in stirred vessels, thin-film evaporators, falling-film evaporators, stirred vessel cascades, extruders, kneaders, simple disc reactors and high-viscosity disc reactors. Analogously to the phase boundary process, branched poly- or copolycarbonates can be prepared by the use of polyfunctional compounds.

The relative solution viscosity of the copolycarbonates according to the invention, determined according to DIN 51562, is preferably in the range of =1.15-1.35.

Embodiments which make use of parameters, compounds, definitions and explanations which are mentioned under preferably, particularly preferably or very particularly preferably, etc. are preferred, particularly preferred or very particularly preferred.

The general definitions, parameters, compounds and explanations mentioned in the description or definitions, parameters, compounds and explanations mentioned in preferred ranges can, however, also be combined with one another arbitrarily, i.e. between the respective ranges and preferred ranges.

The copolycarbonates according to the invention can be worked up in a known manner and can be processed to give any desired mouldings, for example by extrusion, injection moulding, or extrusion blow moulding.

The copolycarbonates according to the invention can also receive admixtures of other aromatic polycarbonates and/or of other aromatic polyester carbonates and/or of other aromatic polyesters in a known manner, for example by compounding.

The copolycarbonates according to the invention can also receive admixtures of the additives that are conventional for these thermoplastics, examples being mould-release agents or gamma-stabilizers, in the conventional amounts. They can also comprise content of a further plastic (blend).

The copolycarbonates according to the invention, optionally as a mixture with other thermoplastics and/or customary additives, can be processed to give any desired mouldings/extrudates and used wherever already known polycarbonates, polyester carbonates and polyesters are used. Owing to their property profile, they are suitable in particular as materials for the injection moulding of relatively large shaped articles, for example car windscreens. Owing to the low water absorption and the associated improved dimensional stability, however, they are also suitable in particular as substrate materials for optical data stores, such as, for example, CD, CD-R, DVD, DVD-R, Blu-ray disc or Advanced Optical Disc (AOD), but can also be used, for example, as films in the electrical sector, as shaped articles in automotive construction and as sheets for covers in the safety area. Further possible applications of the polycarbonates according to the invention are:

1. Safety panes, which are known to be required in many areas of buildings, vehicles and aircraft, and as identification plates of helmets.
2. Production of films, in particular ski films.
3. Production of blown products (see, for example, U.S. Pat. No. 2,964,794), for example 1 to 5 gallon water bottles.
4. Production of transparent sheets, in particular of multi-skin sheets, for example for covering buildings, such as railway stations, greenhouses and lighting systems.
5. Production of optical data stores.
6. For the production of traffic light housings or traffic signs.
7. For the production of foams (see, for example DE-B 1 031 507).
8. For the production of filaments and wires (see, for example DE-B 1 137 167 and DE-A 1 785 137).
9. As translucent plastics having a content of glass fibres for lighting purposes (cf. for example DE-A 1 554 920).
10. As translucent plastics having a content of barium sulphate, titanium dioxide and/or zirconium oxide or organic polymeric acrylate rubbers (EP-A 634 445, EP-A 269324) for the production of transparent and light-scattering shaped articles.
11. For the production of precision injection moulded parts, such as, for example, lens holders. This is achieved by using polycarbonates with content of glass fibres among which also optionally contain about 1-10% by weight of $MoS_2$, based on total weight.
12. For the production of optical instrument parts, in particular lenses for photo and cine cameras (cf. for example DE-A 2 701 173).
13. As light transmission media, in particular as fibre optic cables (see, for example EP-A 0 089 801).
14. As electrical insulation materials for electrical conductors and for plug housings and connectors.
15. Production of mobile phone housings with improved resistance to perfume, aftershave and perspiration.
16. Network interface devices
17. As substrate material for organic photoconductors.
18. For the production of lights, e.g. headlamps, diffuser screens or inner lenses, and long-field lights.
19. For food applications, such as, for example, bottles, crockery and chocolate moulds.
20. For applications in the automotive sector, where contact with fuels and lubricants may occur, such as, for example, bumpers, optionally in the of suitable blends with ABS or suitable rubbers.
21. For sports items, e.g. slalom poles or ski boot clips.
22. For household items, e.g. kitchen sinks and letter-box housings.
23. For housings, such as, for example, electrical distributor cabinets.
24. Housings for electric toothbrushes and hair-dryer housings
25. Transparent washing machine portholes having improved resistance to the washing solution
26. Safety goggles, visors and optical corrective glasses.
27. Lamp coverings for kitchen equipment having improved resistance to kitchen fume, in particular to oil fume
28. Packaging films for pharmaceutical products.
29. Chip boxes and chip carriers.
30. For other applications, e.g. animal cages or doors for indoor animal-fattening units.
31. Safety helmets Possible uses for the polycarbonates according to the invention in the medical industry are:

32. For medical applications, e.g. oxygenators, dialysers (hollow-fibre dialysers), dialysis modules or haemofilters (transparent housing parts of the said "artificial kidneys")
33. Cardiotomy reservoirs (for use during the operation for collection of blood removed by suction)
34. Blood heat exchangers
35. Hose connectors
36. 3-way valves 37. Blood filters
38. Injection systems (for direct contact with blood and intravenously introduced liquids)
39. Inhalers (for treating asthma and respiratory tract)
40. Centrifuge systems in medical technology (blood centrifuge in combination with a cardiotomy reservoir)
41. Ampoules (e.g. for needleless injection system)
42. Films, for example for use in blood sugar measuring devices
43. Patient terminal (e.g. call systems for care personnel)
44. Operation boxes for scalpels in surgery
45. Suction-removal devices for emergency medicine
46. Lamp housings for baby incubators
47. Respiratory aid, e.g. bag valve mask for emergency medical services
48. Laparoscope for microsurgery
49. Packaging films for pharmaceutical products Particularly preferred applications are soft keys in electrical/electronic (E/E) applications, lenses (e.g. infrared lenses), screen/display covers and films. The use of mouldings and extrudates comprising the polymers according to the invention in electronic applications, such as the use of the materials in keypads and housings, is particularly preferred. Mobile phones, computers and digital cameras constitute a preferred field of use.

The mouldings, extrudates and films and film laminates comprising the polymers according to the invention are likewise subject matter of this application, as are shaped articles, extrudates and films containing coextrusion layers comprising the polymers according to the invention.

The following examples are intended to illustrate the invention but without limiting it.

EXAMPLES

Production of the Diphenols

Example 1

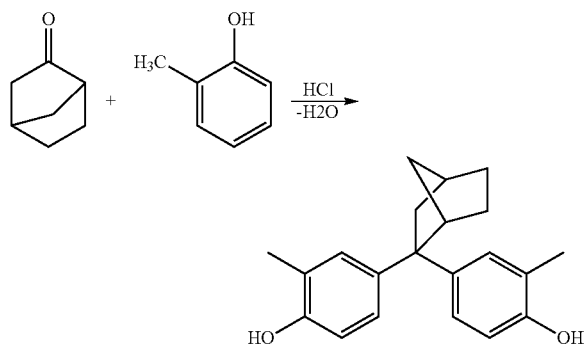

An amount of 55.08 g (0.5 mol) of norcamphor, 324.42 g (3.0 mol) of cresol of purity >99% and 1.0 g (0.005 mol) of 3-mercaptopropionic acid (99+%) is used as initial charge under nitrogen at about 36° C. in a multinecked round-bottomed flask.

Hydrogen chloride gas is then introduced from the compressed-gas cylinder into the transparent solution until saturation has been reached. The reaction is slightly exothermic and heats the entire solution to about 42° C.

Once introduction is complete, the mixture is heated within 10 minutes to 60° C. for 25 minutes.

Once the reaction has ended, stirring of the mixture is continued for 5 hours.

On the following day, the excess HCl is drawn off at 80° C. under the vacuum provided by a water pump. The residue is subjected to careful incipient distillation under high vacuum, in order to remove the excess of cresol and catalyst.

The residue is taken up in methylene chloride and washed repeatedly with water, and the organic phase is isolated and dried over sodium sulphate. The solution is then concentrated by evaporation and dried to constant weight at 80° C. under the vacuum provided by a water pump. This gives a whitish beige solid.

Analysis:
$^1$H NMR (400 MHz, TMS, DMSO) δ=8.9 ppm (s, 2H); 6.85-7.0 (m, 4H); 6.55-6.6 (m, 2H); 1.0-3.2 (m, 10H); 2.0 (s, 6H).

Example 2

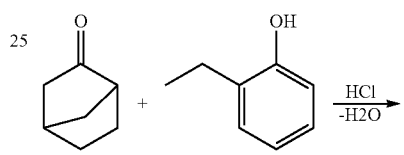

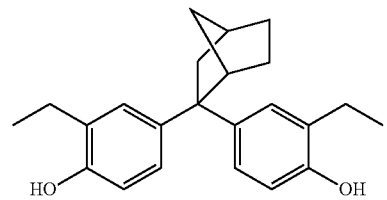

An amount of 37.45 g (0.34 mol) of norcamphor, 418 g (3.4 mol) of 2-ethylphenol (freshly distilled) and 0.81 g (0.004 mol) of dodecyl mercaptan is used as initial charge under nitrogen at about 36° C. in a multinecked round-bottomed flask.

Hydrogen chloride gas is then introduced from the compressed-gas cylinder into the transparent solution until saturation has been reached. The reaction is slightly exothermic and heats the entire solution to about 42° C.

Once introduction is complete, the mixture is heated within 10 minutes to 60° C. for 25 minutes. Once the reaction has ended, stirring of the mixture is continued for 5 hours.

On the following day, the excess HCl is drawn off at 80° C. under the vacuum provided by a water pump and the residue is then subjected to careful incipient distillation under high vacuum, in order to remove the excess of 2-ethylphenol and catalyst.

The residue is taken up in methylene chloride and washed repeatedly with water, and the organic phase is isolated and dried over sodium sulphate. The solution is then concentrated by evaporation and dried to constant weight at 80° C. under the vacuum provided by a water pump. This gives a whitish beige solid.

Analysis:

$^1$H NMR (400 MHz, TMS, DMSO) δ=8.85 ppm (s, 2H); 6.85-7.0 (m, 4H); 6.55-6.6 (m, 2H); 1.0-3.2 (m, 20H).

Example 3

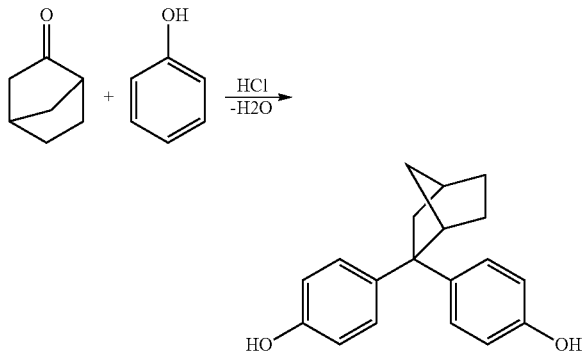

An amount of 44.06 g (0.4 mol) of norcamphor, 376.4 g (4.0 mol) of phenol and 0.81 g (0.004 mol) of dodecyl mercaptan is used as initial charge at about 36° C. under nitrogen in a multinecked round-bottomed flask.

Hydrogen chloride gas is then introduced from the compressed-gas cylinder into the transparent solution until saturation has been reached. The reaction is slightly exothermic and heats the entire solution to about 42° C.

Once introduction is complete, the mixture is heated within 10 minutes to 60° C. for 25 minutes.

Once the reaction has ended, stirring of the mixture is continued for 5 hours. On the following day, the excess HCl is drawn off at 80° C. under the vacuum provided by a water pump and the residue is then subjected to careful incipient distillation under high vacuum, in order to remove the excess of cresol and catalyst.

The residue is taken up in methylene chloride and washed repeatedly with water, and the organic phase is isolated and dried over sodium sulphate. The solution is then concentrated by evaporation and dried to constant weight at 80° C. under the vacuum provided by a water pump. This gives a whitish beige solid.

Analysis:

$^1$H NMR (400 MHz, TMS, DMSO) δ=9.05 ppm (d, 2H); 7.0-7.1 (m, 4H); 6.6 (m, 4H); 1.0-3.2 (m, 10H).

Example 4

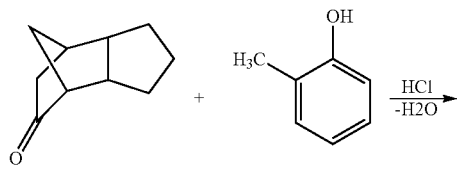

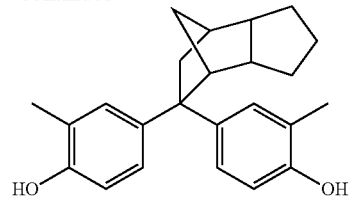

An amount of 158.13 g (1.0 mol) of tricyclo[5.2.1.0$^{2.6}$] decan-8-one, 500.0 g (4.6 mol) of cresol of purity >99% and 2.0 g (0.01 mol) of 3-mercaptopropionic acid (99+%) is used as initial charge at about 36° C. under nitrogen.

Hydrogen chloride gas is then introduced from the compressed-gas cylinder into the transparent solution until saturation has been reached. The reaction is slightly exothermic and heats the entire solution to about 42° C.

Once introduction is complete, the mixture is heated within 10 minutes to 60° C. for 25 minutes. Once the reaction has ended, stirring of the mixture is continued for 5 hours.

On the following day, the excess HCl is drawn off at 80° C. under the vacuum provided by a water pump and the residue is then subjected to careful incipient distillation under high vacuum, in order to remove the excess of cresol and catalyst.

The residue is taken up in methylene chloride and washed repeatedly with water, and the organic phase is isolated and dried over sodium sulphate. The solution is then concentrated by evaporation and dried to constant weight at 80° C. under the vacuum provided by a water pump. This gives a whitish beige solid.

Analysis:

$^1$H NMR (400 MHz, TMS, DMSO) δ=8.85 ppm (s, 2H); 6.85-7.0 (m, 4H); 6.55-6.6 (m, 2H); 1.0-3.2 (m, 14H); 2.1 (s, 6H).

Example 5

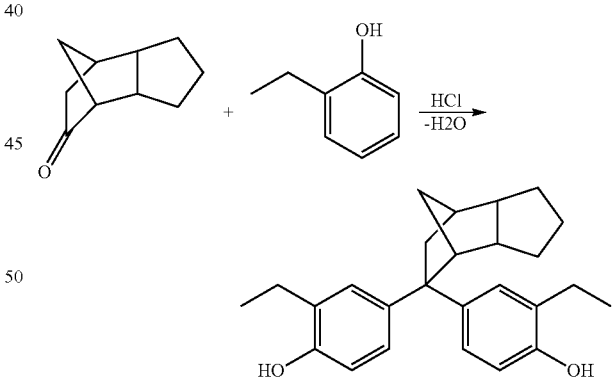

An amount of 63.3 g (0.4 mol) of tricyclo[5.2.1.0$^{2.6}$]decan-8-one, 488.7 g (4.0 mol) of o-ethyl-phenol of purity >99% and 0.812 g (0.004 mol) of dodecyl mercaptan is used as initial charge at about 36° C. under nitrogen in a multinecked round-bottomed flask.

Hydrogen chloride gas is then introduced from the compressed-gas cylinder into the transparent solution until saturation has been reached.

The reaction is slightly exothermic and heats the entire solution to about 42° C.

Once introduction is complete, the mixture is heated within 10 minutes to 60° C. for 25 minutes.

Once the reaction has ended, stirring of the mixture is continued for 5 hours. On the following day, the excess HCl is drawn off at 80° C. under the vacuum provided by a water pump and the residue is then subjected to careful incipient distillation under high vacuum, in order to remove the excess of cresol and catalyst.

The residue is taken up in methylene chloride and washed repeatedly with water, and the organic phase is isolated and dried over sodium sulphate. The solution is then concentrated by evaporation and dried to constant weight at 80° C. under the vacuum provided by a water pump.

Analysis:

$^1$H NMR (400 MHz, TMS, DMSO) δ=8.85 ppm (s, 2H); 6.80-7.0 (m, 4H); 6.55-6.6 (m, 2H); 1.0-3.2 (m, 24H).

Example 6

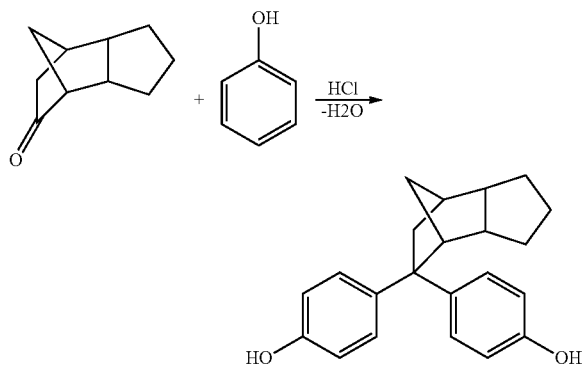

An amount of 158.13 g (1.0 mol) of tricyclo[5.2.1.0$^{2.6}$] decan-8-one, 500 g (5.31 mol) of phenol of purity >99% and 2.0 g (0.01 mol) of 3-mercaptopropionic acid (99+%) is used as initial charge at about 36° C. under nitrogen.

Hydrogen chloride gas is then introduced from the compressed-gas cylinder into the transparent solution until saturation has been reached. The reaction is slightly exothermic and heats the entire solution to about 42° C.

Once introduction is complete, the mixture is heated within 10 minutes to 60° C. for 25 minutes.

Once the reaction has ended, stirring of the mixture is continued for 5 hours.

On the following day, the excess HCl is drawn off at 80° C. under the vacuum provided by a water pump and the residue is then subjected to careful incipient distillation under high vacuum, in order to remove the excess of cresol and catalyst.

The residue is taken up in methylene chloride and washed repeatedly with water, and the organic phase is isolated and dried over sodium sulphate. The solution is then concentrated by evaporation and dried to constant weight at 80° C. under the vacuum provided by a water pump. This gives a whitish beige solid.

Analysis:

$^1$H NMR (400 MHz, TMS, DMSO) δ=9.0 ppm (s, 2H); 7.0-7.1 (m, 4H); 6.55-6.6 (m, 4H); 0.85-3.2 (m, 14H).

Production of the Copolycarbonates

Example 7

Synthesis of a Copolycarbonate Made of Bisphenol a and Bisphenol from Example 1

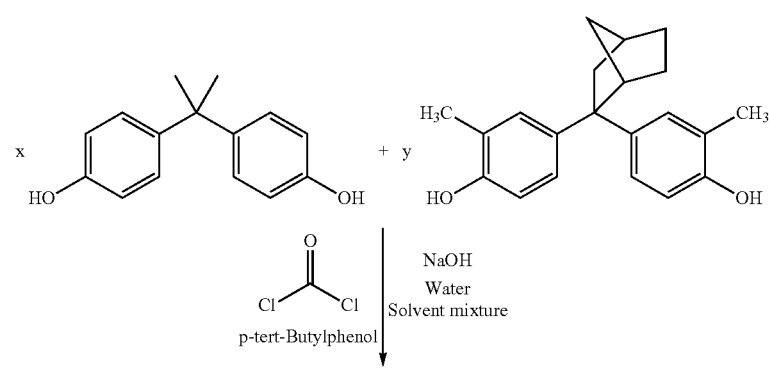

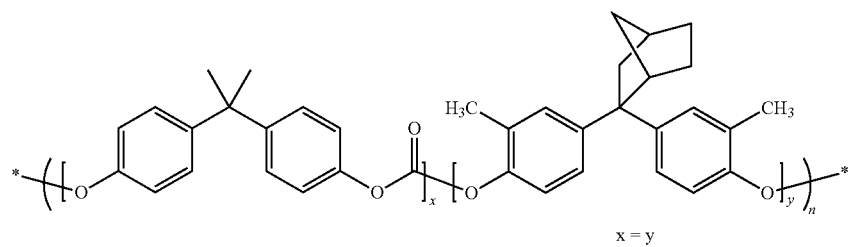

Methylene chloride (306 ml) is added to a nitrogen-inertized solution of 17.12 g (0.075 mol) of bisphenol A (BPA), 23.13 g (0.075 mol) of bisphenol from Example 1, 0.68 g (0.0045 mol, 3.0 mol %, based on diphenols) of p-tert-butylphenol (BUP) as chain terminator and 13.2 g (0.33 mol) of sodium hydroxide in 306 ml of water. Phosgene (29.7 g) (0.3 mol) is introduced at a pH of from 12.5 to 13.5 and 20° C. In order to avoid allowing the pH to fall below 12.5, 30% strength sodium hydroxide solution was added during the phosgenation process. Once the phosgenation process had ended and the mixture had been flushed with nitrogen, stirring was continued for a further 5 minutes, and then 0.17 g (0.0015 mol, 1 mol %, based on diphenols) of N-ethylpiperidine was added as catalyst and stirring was continued for 1 hour. The aqueous phase was separated off, and then the organic phase was acidified with phosphoric acid and washed 8 times with, in each case, 1000 ml of distilled water, until neutral and salt-free. The organic phase is isolated and dried over sodium sulphate and then concentrated by evaporation at 80° C. under the vacuum provided by a water pump and finally dried to constant weight at 130° C. under the vacuum provided by a water pump.

This gives transparent polycarbonate (see Table 1 for analysis).

Examples 8 to 16

Further Copolycarbonates 8-16 were Produced by Analogy with Example 7 (see Table 1)

The copolycarbonates were characterized by means of glass transition temperature Tg and relative solution viscosity $\eta_{rel}$. Tg was determined by dynamic differential thermal analysis (DSC) according to ISO 11357. Relative solution viscosity was determined in methylene chloride as solvent at a concentration of 0.5 g/l and at a temperature of 25° C. by using an Ubbelohde viscometer (DIN 51562).

TABLE 1

| Copolycarbonate | Example 7 | Example 8 |
|---|---|---|
| Bisphenol from Example 1 [mol %] | 50 | 30 |
| Bisphenol A [mol %] | 50 | 70 |
| Tg [° C.] | 171/177 | 149/166 |
| $\eta_{rel}$ | 1.254 | 1.267 |

| Copolycarbonate | Example 9 | |
|---|---|---|
| Bisphenol from Example 2 [mol %] | 30 | |
| Bisphenol A [mol %] | 70 | |
| Tg [° C.] | 132/139 | |
| $\eta_{rel}$ | 1.176 | |

| Copolycarbonate | Example 10 | Example 11 |
|---|---|---|
| Bisphenol from Example 3 [mol %] | 50 | 30 |
| Bisphenol A [mol %] | 50 | 70 |
| Tg [° C.] | 177/180 | 165/173 |
| $\eta_{rel}$ | 1.31 | 1.315 |

| Copolycarbonate | Example 12 | Example 13 |
|---|---|---|
| Bisphenol from Example 4 [mol %] | 50 | 30 |

TABLE 1-continued

| Bisphenol A [mol %] | 50 | 70 |
|---|---|---|
| Tg [° C.] | 188 | 167/172 |
| $\eta_{rel}$ | 1.237 | 1.267 |

| Copolycarbonate | Example 14 | |
|---|---|---|
| Bisphenol from Example 5 [mol %] | 30 | |
| Bisphenol A [mol %] | 70 | |
| Tg [° C.] | 137/138 | |
| $\eta_{rel}$ | 1.165 | |

| Copolycarbonate | Example 15 | Example 16 |
|---|---|---|
| Bisphenol from Example 6 [mol %] | 50 | 30 |
| Bisphenol A [mol %] | 50 | 70 |
| Tg [° C.] | 204/196 | 183/186 |
| $\eta_{rel}$ | 1.256 | 1.267 |

Example 17

Comparative Example

Lexan DMX 2415 from Sabic

| Tg [° C.] | 145° C. |
|---|---|
| $\eta_{rel}$ | 1.235 |

Measurement of the Surface Hardness:

The copolycarbonates are predried overnight at 120° C. in a drying oven. The polymers were then dissolved in methylene chloride and poured into small dishes having a diameter of 5 cm. The solvent was evaporated off and the remaining polymer body was once again dried overnight at 120° C. in a vacuum drying oven. After removal of the polymer from the small dish, circular sample discs having a diameter of 5 cm and a thickness of about 1-1.5 mm are obtained.

The measurement of the surface hardness is effected on small panels by means of an atomic force microscope AFM (Digital Instruments Nanoscope), the volume in each case mechanically removed from the sample surface by the production of a screen (indentation of the material) in $\mu m^3$ being obtained as measured variable and hence as a unit of measurement for the surface hardness, with specification of the penetration force of a diamond tip in a Nanoindent measuring head (from Hysitron) into the polymer surface (80 µN), the scanning speed of the tip (1 Hz) and the size of the measuring field (30×30 in the form of a screen with 256 lines). The greater the volume, the softer is the material surface of the respective copolycarbonate. Smaller volume values therefore indicate an improved surface hardness. Measured values on copolycarbonates according to the invention and on the comparative example are shown in Table 2.

TABLE 2

| | Example | Example | Example | Example |
|---|---|---|---|---|
| Copolycarbonate | 17 | 7 | 8 | 12 |
| Volume of depression [μm³] | 57.4 | 32.7 | 26.1 | 33.4 |

| | Example | Example | Example |
|---|---|---|---|
| Copolycarbonate | 13 | 9 | 14 |
| Volume of depression [μm³] | 38.2 | 46.7 | 47.0 |

The inventive examples of copolycarbonates having diphenol units, where these have a rigid ring bridge in the molecule, exhibit significantly lower volume values here than those for the comparative example of a copolycarbonate having diphenol unit without ring bridge.

The invention claimed is:

1. A copolycarbonate comprising one or more diphenol compounds selected from the group consisting of

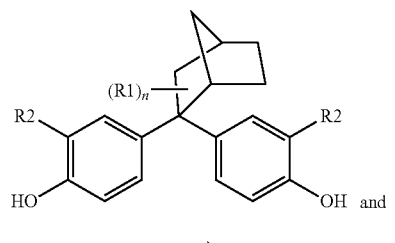

(2a)

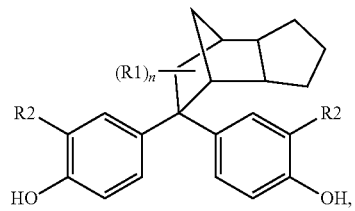

(2b)

wherein
R1 represents a C1-C4-alkyl,
n is 0, 1, 2 or 3, and
R2 represents H or a linear or branched C1-C10-alkyl; and
wherein the copolycarbonate comprises from 0.1 to 70 mol % of the diphenols of the formula (2a) and (2b), based on the total amount of diphenols used.

2. The copolycarbonate according to claim 1, wherein the copolycarbonate further comprises a diphenol of the formula (3a)

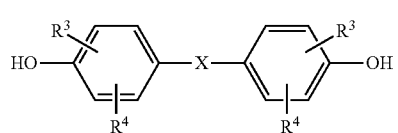

(3a)

wherein
R³ and R⁴, independently of one another, represent a substituent selected from the group consisting of hydrogen, $C_1$-$C_{18}$-alkyl, $C_1$-$C_{18}$-alkoxy, halogen, optionally substituted aryl and optionally substituted aralkyl, and
X represents a single bond, a $C_6$-$C_{12}$-arylene which may optionally be condensed with further aromatic rings containing heteroatoms, or a substituent selected from the group consisting of —$SO_2$—, —CO—, —O—, —S—, $C_1$- to $C_6$-alkylene, $C_2$- to $C_5$-alkylidene and $C_5$- to $C_6$-cycloalkylidene, wherein the substituent may be optionally substituted by a $C_1$- to $C_6$-alkyl.

3. The copolycarbonate according to claim 1, wherein the copolycarbonate comprises from 5 to 40 mol % of the diphenols of the formula (2a) and (2b), based on the amount of diphenols used.

4. The copolycarbonate according to claim 1, wherein the copolycarbonate comprises from 10 to 35 mol % of the diphenols of the formula (2a) and (2b), based on the amount of diphenols used.

5. The copolycarbonate according to claim 1, wherein R2 is methyl and n is 0.

6. The copolycarbonate according to claim 1, wherein R2 is H and n is 0.

7. The copolycarbonate according to claim 2, wherein the diphenols of the formula (3a) are selected from the group consisting of bisphenol A, 4,4'-dihydroxybiphenyl, bisphenol M, bisphenol TMC, a compound of the formula (3c)

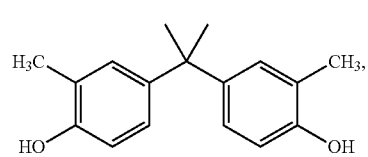

(3c)

and mixtures thereof.

8. The copolycarbonate according to claim 1 wherein the copolycarbonate comprises at least one combination of diphenols selected from the group of combinations consisting of a)

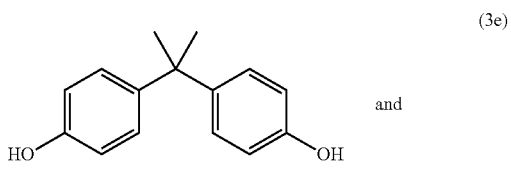

(3e)

and b)

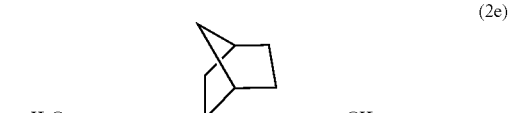

(2e)

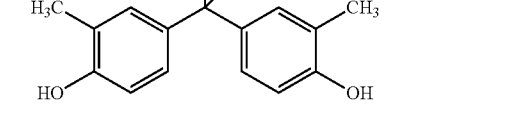

(3c)

and

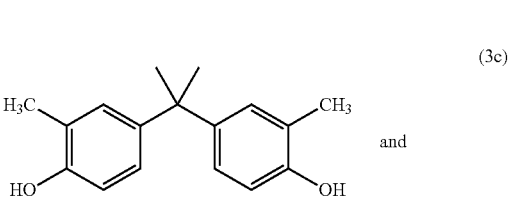

c) 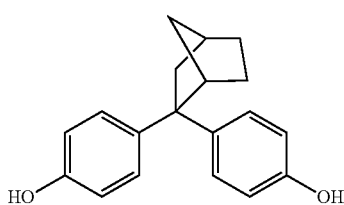 (2f)

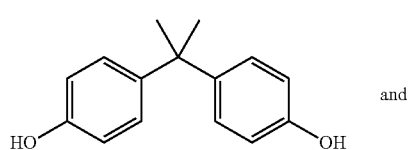 and (2g)

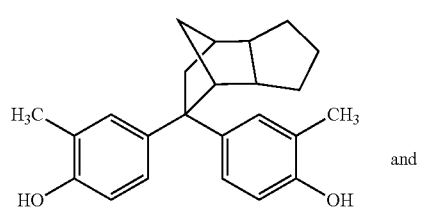 and (3c)

d) 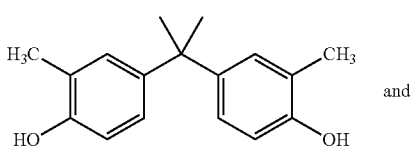

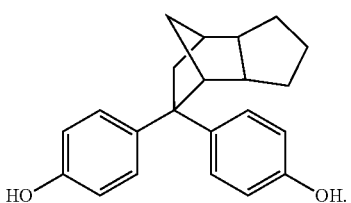 (2h)

9. The copolycarbonates according to claim 1, wherein the copolycarbonates have a solution viscosity $\eta_{rel}$ of from 1.15 to 1.35.

10. Shaped articles, extrudates, films, film laminates and coextrusion layers obtained with the copolycarbonates according to claim 1.

11. Shaped articles, extrudates, films and film laminates, obtained from the copolycarbonates according to claim 1.

12. Shaped articles, extrudates and films comprising coextrusion layers which are obtained from the copolycarbonates according to claim 1.

13. A composition comprising a blend of the copolycarbonates according to claim 1 with thermoplastic polymers.

14. A process for the preparation of copolycarbonates according to claim 1 by a phase boundary process or a melt transesterification process, wherein one or more compounds selected from compounds of the formulae (1a) and (1b) are used as diphenols.

15. A keypad in an electrical or electronic device, a lens, or a screen/display cover obtained from the copolycarbonates according to claim 1.

\* \* \* \* \*